US011562300B2

(12) United States Patent
Tulabandhula et al.

(10) Patent No.: US 11,562,300 B2
(45) Date of Patent: Jan. 24, 2023

(54) SYSTEM AND METHOD FOR OPTIMAL AUTOMATED BOOKING OF ON-DEMAND TRANSPORTATION IN MULTI-MODAL JOURNEYS

(71) Applicant: Conduent Business Services, LLC, Dallas, TX (US)

(72) Inventors: Theja Tulabandhula, Karnataka (IN); Narendra Annamaneni, Andhra Pradesh (IN)

(73) Assignee: Conduent Business Services, LLC, Dallas, TX (US)

( * ) Notice: Subject to any disclaimer, the term of this patent is extended or adjusted under 35 U.S.C. 154(b) by 1473 days.

(21) Appl. No.: 15/178,936

(22) Filed: Jun. 10, 2016

(65) Prior Publication Data
US 2017/0357914 A1 Dec. 14, 2017

(51) Int. Cl.
G06Q 10/00 (2012.01)
G06Q 10/02 (2012.01)
(Continued)

(52) U.S. Cl.
CPC ......... *G06Q 10/02* (2013.01); *G01C 21/3423* (2013.01); *G06F 16/9537* (2019.01); *H04W 4/025* (2013.01)

(58) Field of Classification Search
None
See application file for complete search history.

(56) References Cited

U.S. PATENT DOCUMENTS 5,836,529 A 11/1998 Gibbs
6,834,229 B2 12/2004 Rafiah et al.
(Continued)

FOREIGN PATENT DOCUMENTS

EP 2051223 A1 4/2009
JP 2002154612 A 5/2002
(Continued)

OTHER PUBLICATIONS

Delling et al., "Round-Based Public Transit Routing", Proceedings of the 14th Meeting on Algorithm Engineering and Experiments (ALENEX'12) Jan. 16, 2012.
(Continued)

*Primary Examiner* — Tonya Joseph
(74) *Attorney, Agent, or Firm* — Fox Rothschild LLP

(57) ABSTRACT

A method for automated booking of an on-demand service in a multimodal journey includes receiving information related to a multimodal trip plan for a commuter trip. The multimodal trip plan includes a plurality of segments, and the plurality of segments include an on-demand service segment that requires an on-demand service vehicle as the mode of transport. The method also includes receiving real-time information relating to a location of the commuter from one or more location tracking sensors, determining an estimated time of arrival of the commuter at a transfer point for transfer to the on-demand service segment by analyzing the real-time information, identifying a time of availability of an on-demand service vehicle at the transfer point (as a function of a time of booking), and determining an optimal time of booking of the on-demand service vehicle based on the estimated time of arrival and the time of availability.

28 Claims, 9 Drawing Sheets

(51) Int. Cl.
    *H04W 4/02*     (2018.01)
    *G01C 21/34*    (2006.01)
    *G06F 16/9537*  (2019.01)

(56)         References Cited

U.S. PATENT DOCUMENTS

| | | | |
|---|---|---|---|
| 7,546,206 | B1 | 6/2009 | Miller et al. |
| 8,090,532 | B2 | 1/2012 | Tashev et al. |
| 8,494,771 | B2 | 7/2013 | Delling et al. |
| 8,909,475 | B2 | 12/2014 | Gishen |
| 9,020,763 | B2 | 4/2015 | Faaborg et al. |
| 9,117,223 | B1 * | 8/2015 | Handel ............ G06F 16/24575 |
| 9,304,009 | B2 | 4/2016 | Beaurepaire et al. |
| 9,404,760 | B2 | 8/2016 | Ulloa Paredes |
| 9,435,658 | B2 | 9/2016 | Geisberger et al. |
| 9,635,137 | B2 | 4/2017 | Brobst et al. |
| 10,147,058 | B1 | 12/2018 | Ouimette |
| 2005/0165789 | A1 | 7/2005 | Minton et al. |
| 2006/0074544 | A1 | 4/2006 | Morariu et al. |
| 2007/0106434 | A1 | 5/2007 | Galbraith et al. |
| 2008/0027772 | A1 | 1/2008 | Gernega et al. |
| 2008/0077309 | A1 | 3/2008 | Cobbold |
| 2009/0119001 | A1 | 5/2009 | Moussaeiff et al. |
| 2011/0112759 | A1 | 5/2011 | Bast et al. |
| 2011/0225269 | A1 * | 9/2011 | Yap ..................... G06Q 10/06 709/219 |
| 2012/0010803 | A1 | 1/2012 | Min et al. |
| 2012/0095861 | A1 * | 4/2012 | Feng ..................... G06Q 10/00 705/26.7 |
| 2012/0173135 | A1 | 7/2012 | Gutman |
| 2012/0253929 | A1 | 10/2012 | Alberth |
| 2012/0323992 | A1 | 12/2012 | Brobst et al. |
| 2013/0046456 | A1 | 2/2013 | Scofield et al. |
| 2013/0262222 | A1 | 10/2013 | Gibson et al. |
| 2013/0265319 | A1 | 10/2013 | Fisher et al. |
| 2013/0275861 | A1 | 10/2013 | Goddard et al. |
| 2013/0304381 | A1 | 11/2013 | Nesbitt |
| 2013/0317742 | A1 | 11/2013 | Ulloa Paredes et al. |
| 2013/0317747 | A1 | 11/2013 | Chidlovskii et al. |
| 2013/0317884 | A1 | 11/2013 | Chidlovskii |
| 2014/0032113 | A1 | 1/2014 | Nesbitt |
| 2014/0035921 | A1 | 2/2014 | Yeh |
| 2014/0040166 | A1 | 2/2014 | Handley |
| 2014/0050122 | A1 * | 2/2014 | Pro ..................... H04W 4/029 370/260 |
| 2014/0089036 | A1 | 3/2014 | Chidlovskii |
| 2014/0111358 | A1 | 4/2014 | Gontmakher et al. |
| 2014/0188788 | A1 | 7/2014 | Bridgen et al. |
| 2015/0199638 | A1 | 7/2015 | Gil |
| 2015/0204685 | A1 | 7/2015 | Gearhart et al. |
| 2015/0287058 | A1 * | 10/2015 | Dance ................ G06Q 30/0202 705/7.35 |
| 2015/0294566 | A1 | 10/2015 | Huang et al. |
| 2015/0329129 | A1 | 11/2015 | Sengupta et al. |
| 2016/0231129 | A1 * | 8/2016 | Erez ................. G01C 21/3423 |

FOREIGN PATENT DOCUMENTS

| | | |
|---|---|---|
| WO | WO-200161276 A2 | 8/2001 |
| WO | WO-2007061264 A1 | 5/2007 |
| WO | WO-2009092812 A1 | 7/2009 |

OTHER PUBLICATIONS

Feng, Wei et al., "Developing a bus service reliability evaluation and visualization framework using archived AVL/APC data", 2012, paper presented at the Westerm ITE Conference, Santa Barbara, CA, USA.

Mai, Eric et al., "Visualizing Bus Schedule Adherence and Passenger Load Through Marey Graphs", 18th ITS World Congress, 2011.

* cited by examiner

SYSTEM AND METHOD FOR OPTIMAL AUTOMATED BOOKING OF ON-DEMAND TRANSPORTATION IN MULTI-MODAL JOURNEYS

BACKGROUND

A multi-modal trip typically involves various segments on different modes of transport in a transportation network, serviced by various public and on-demand (private and/or semi-private) transport services. Current systems use historic or predictive data to identify the need for resources (such as an on-demand service in a trip) and create apriori schedules based on expected patterns to determine when to deliver the necessary resources to each location. However, the beginning and termination of segments in a trip may depend on various exogenous factors such as prevailing traffic conditions, resource availabilities and congestion. These factors result in uncertainty with respect to the time of arrival and departure of a commuter at each segment, which may then cause delays for the commuter.

This becomes more pertinent when one or more segments of a trip are serviced by on-demand transportation modes, and the availability of the on-demand services also plays a role in trip planning and schedule adherence. One of the many different ways the inefficiency or sub-optimality of a multi-modal trip manifests is via waiting times due to a mismatch between the arrival of the commuter to the transfer point and the availability of the on-demand transportation service. Such mismatches are highly undesirable leading to increased overall trip times, unhappy commuters and unwarranted expenses for waiting times incurred by the on-demand services.

Current multi-modal trip planners (MMTPs) either push the burden of booking the on-demand service on to the commuter or book the on-demand transport mode well in advance. The former is undesirable as the commuter has to potentially perform the booking herself in the face of limited information and time constraints leading to significant travel delays for the commuter and wait times for the on-demand service. This problem is not solved even if the MMTP books the on-demand transportation at the time of trip selection (or in advance of the trip), without taking into account real-time factors during the trip itself.

This document describes methods and systems that address at least some of the problems described above, and/or other problems.

SUMMARY

In an embodiment, a method (and system) for automated booking of an on-demand service in a multimodal journey may include receiving information related to a multimodal trip plan in a transportation network associated with a trip of a commuter. The multimodal trip plan may include a plurality of segments, and at least on of the plurality of segments is an on-demand service segment. An on-demand service segment requires an on-demand service vehicle as the mode of transport. The system may receive real-time information relating to a location of the commuter while the commuter travels the trip from one or more location tracking sensors. The system may then analyze the real-time information relating to the location of the commuter while traveling on a segment that is not the on-demand service segment to determine an estimated time of arrival of the commuter at a transfer point for transfer to the on-demand service segment. The system may also identify a time of availability of an on-demand service vehicle for the commuter to begin the on-demand service segment at the transfer point, as a function of a time of booking, and determining an optimal time of booking of the on-demand service vehicle based on the estimated time of arrival and the time of availability. The system may transmit a communication to initiate the on-demand service segment within a threshold time of the optimal time.

In an embodiment, wherein the estimated time of arrival is a random variable associated with a known distribution function. Alternatively and/or additionally, the estimated time of arrival is a random variable associated with a time varying distribution function. The time of availability of the on-demand service vehicle may be modeled as: a known deterministic function of the time of booking, an unknown deterministic function of the time of booking, a time-varying stochastic availability function of the time of booking, or a fixed stochastic function of the time of availability.

The location tracking sensors may include a global positioning service associated with an electronic device of the commuter, a global positioning service associated with a vehicle used by the commuter during the trip, one or more micro-location sensors, or an accelerometer associated with a vehicle used by the commuter during the trip.

In an embodiment, transmitting the communication to initiate the on-demand service segment may include automatically booking the on-demand service vehicle to arrive at the transfer point at the estimated time of arrival. Optionally, transmitting the communication to initiate the on-demand service segment may include providing an identification of the on-demand service vehicle and the determined optimal time to the commuter, via a user interface associated with an electronic device of the commuter.

In at least one embodiment, identifying the time of availability of the on-demand service vehicle at the transfer point as a function of the time of booking may include identifying a set of commuter preferences, identifying one or more preferred on-demand service providers based on the set of commuter preferences, querying the one or more preferred on-demand services for availability at the transfer point at the estimated time of arrival to identify one or more on-demand service vehicles that will be available at the transfer point, identifying a preferred on-demand service vehicle that will be available at the transfer point at the estimated time of arrival, and identifying a time of availability of the preferred on-demand service vehicle at the transfer point as a function of a time of booking, as the time of availability of the on-demand service vehicle. The preferred on-demand service vehicle may be automatically identified based on the set of commuter preferences. Alternatively and/or additionally, the system may present a list comprising information relating to the one or more on-demand service vehicles to the commuter, and receive a selection of the preferred on-demand service vehicle from the commuter. In an embodiment, identifying the set commuter preferences may include receiving one or more commuter preferences from the commuter, or analyzing a commuter profile associated with the commuter for identifying the one or more commuter preferences. The commuter profile may be updated based on self-learning from past commuter actions. In some embodiment, the system may identifying the time of availability of the preferred on-demand service vehicle at the transfer point as a function of the time of booking, based on one or more of the following: a real-time location of the on-demand service vehicle, information relating to the transportation network, or information relating to a direction of travel of the on-demand service vehicle.

In an embodiment, the system may also monitor the transportation network for receiving information relating to the plurality of segments while the commuter travels the trip, and using the received information for determining the estimated time of arrival of the commuter at the transfer point. The system may monitor the transportation network and receive route information from a map database, traffic alerts from traffic monitors on the trip, weather forecasts from weather monitors on the trip, real-time schedule information for one or more modes of transport associated with the plurality of segments on the trips, or real-time location information for one or more modes of transport associated with the plurality of segments on the trips.

In an embodiment, the system may create a location profile for the transfer point, and use the location profile of the transfer point to provide a recommendation to a user. The location profile may include one or more of the following: commuter demand for a type of on-demand service at the transfer point, on-demand service availability at the transfer point, traffic profile of routes that connect to the transfer point at different times, or types of commuters at the transfer point. The user may be a commuter on a trip that includes the transfer point, and the recommendation may include an alternate route recommendation for the trip based on non-availability of an on-demand service at the transfer point at an estimated time of arrival. Optionally, the user may be a transport agency that provides public transport in the transportation network, and the recommendation may include information relating to provisioning of a public mode of transport at the transfer point. In another embodiment, the user the user may be an on-demand service provider, and the recommendation may include information relating to allocation of on-demand resources at the transfer point.

DETAILED DESCRIPTION

Figure 1:
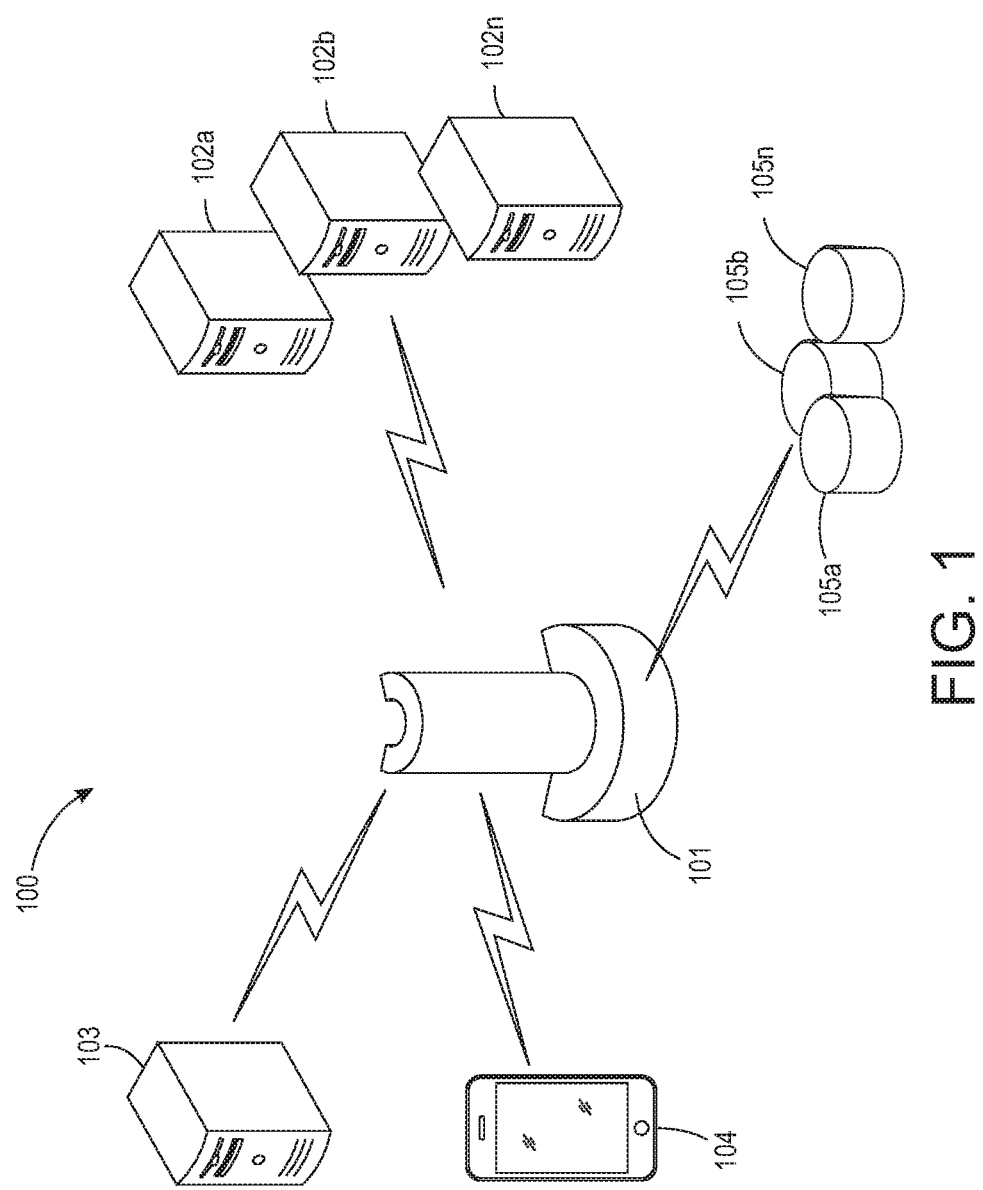
FIG. 1 depicts a shows an example system for automated booking of on-demand transportation services in a multi-modal trip, according to an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, a "computing device" or "processing device" refers to an electronic device or group of multiple electronic devices that processes data in order to perform one or more functions. A computing device or processing device may be a component of any processor-based device such as, for example, a server, a set of networked servers, a personal computer, a personal digital assistant, a web-enabled phone, a smart terminal, a dumb terminal and/or other electronic device or devices capable of communicating in a networked environment. A computing device or processing device will be able to interpret and execute programming instructions.

In this document, the term "electronic device" refers to a device having a processor and a non-transitory, computer-readable medium (i.e., memory). The memory may contain programming instructions in the form of a software application that, when executed by the processor, causes the device to perform one or more processing operations according to the programming instructions. An electronic device also may include additional components such as a touch-sensitive display device, microphone, keyboard or keypad or other components that serve as a user interface, as well as a camera or other imaging device. The electronic device also includes one or more on-board navigational or informational devices, such as GPS-enabled devices. An electronic device also may include one or more communication hardware components such as a transmitter and/or receiver that will enable the device to send and/or receive signals to and/or from other devices, whether via a communications network or via near-field or short-range communication protocols. Examples of electronic devices include smartphones, mobile devices, smart watches, digital cameras, tablet computing devices, electronic readers, personal computers, fitness tracking devices, wearable electronic devices, media players, satellite navigation devices and the like.

In this document, a "line" refers to a scheduled mode of travel on a transportation network, such as a particular train or bus line and all of its stops. A "path" or "route" refers to the overall procedure that a person may follow to take a trip in a transportation network. A route may include travel along a single line, or on two or more lines including transfers, as well as travel via alternate modes of transportation such as walking. A "trip" represents an instance of travel from an origin point i to a destination point j, in a transportation network and it may include one or more modes of transportation (such as bus, train, car, walking, or the like). A trip may be represented as $T_{ij}$. Each trip can be defined as an ordered list of "segments." As used herein, a "segment" refers to a part of a trip on one mode of transportation, and is associated with a transfer point and an end point.

A "transportation network" is a traffic flow network representing the movement of people, vehicles, or goods between one or more points in the network, via one or more routes and modes. A "public transportation network" or "public transportation service" is a shared passenger transport service which is available for use by the general public and is shared by strangers without private arrangement. Examples may include, without limitation, public bus service, trains, airplanes, or the like.

A "mode" is a term used to identify a one of various different ways of performing transportation. Modes may include, without limitation, walking, biking, or traveling by car, bus or train. One mode may include a combination of several other modes. For example "a personal mode" may include walking, biking, and driving. An "on-demand transportation service" or a "public transportation service" are other examples of modes. A mode may also be a subset of what are considered to be standard modes for example "mode 251" may include running above a certain speed and using a car for less than X number of minutes. During the execution of the process, the system may or may not redefine modes.

As used herein, an "on-demand service" or "on-demand transportation service" refers to a user-oriented form of private or semi-public form of transport characterized by flexible routing of vehicles operating in shared-ride mode or single passenger mode between pick-up and drop-off locations according to commuter's needs. Unlike public modes of transport, an on-demand transportation service does not run on a fixed schedule, and has to be booked in advance by the passenger for a desired time and segment of a trip. An "on-demand service" is identified by inviting "on-demand service providers" controlling the on-demand transportation resources to contribute those resources, for example to offer providing rides to passengers. Examples of on-demand services include, without limitation, taxis, ride-sharing services such as UBER or LYFT, car rental services, limousine, airport shuttles, or the like.

As used herein, an "origin" refers to a starting point within the transportation network where a passenger traversing at least a position of the network intends to begin their route. Conversely, a "destination" refers to an ending point within the transportation network where the passenger intends to end their route. A "transfer point" refers to a location between the origin and the destination of a trip where a passenger will transfer from one mode of transportation to a different mode of transportation. A transfer point may be a starting point of a segment in a trip.

FIG. 1 shows an example system for automated booking of on-demand transportation services in a multi-modal trip for a commuter to minimize the waiting time for the commuter, as well the on-demand transportation services. The system may include an automated booking system 101 in communication with an electronic device 104 of a commuter, one or more on-demand transportation service providers (102a, 102b, . . . 102n), and an MMTP 103. A communications link may be a wired or wireless connection such as Internet, intranet, a local area network, a wide area network, cellular network, or any communication system over which the automated booking system 101 may communicate with one or more of the on-demand transportation service providers (102a, 102b, . . . 102n), and an MMTP 103.

Each of the on-demand service providers is associated with and controls one or more on-demand service resources or vehicles. An on-demand service vehicle may include location-tracking sensors such as, without limitation, global positioning system transmitter, accelerometers, or the like. In an embodiment, an on-demand service provider may receive and/or store information relating to the on-demand service vehicles associated with the provider. Examples of such information may include, without limitation, location of on-demand service vehicles in real-time time, availability information of on-demand service vehicles, cost information relating to hiring of the on-demand service vehicles, type, identity and river information of the on-demand service vehicles, and other information received from the on-demand service vehicles (such as traffic conditions, road alerts, passenger pickup or drop off information, or the like).

In an embodiment, the electronic device 104 may include one or more location tracking sensors such as, without limitation, global positioning system transmitter, Wi-Fi triangulation, and micro-location sensors (e.g., hotpots, beacons, tags, transmitters), accelerometer data, location input provided by a user, and any other location-detecting services that can be accessed by the electronic device to determine the location of a user of the electronic device.

In an embodiment, the automated booking system 101 may also be in communication with one or more data sources (105a, 105b, . . . 105n). Examples of such data sources include, without limitation, social networking sites, transportation agencies, on-demand service providers, traffic monitors and broadcasting sources, map databases, weather monitors, or the like. In an embodiment, the data sources provide data relating to transport modes and associated data (such as navigation data from one or more vehicles), up-to-date service schedules, live feeds, and traffic alerts (discussed below with respect to FIG. 2).

Figure 2:
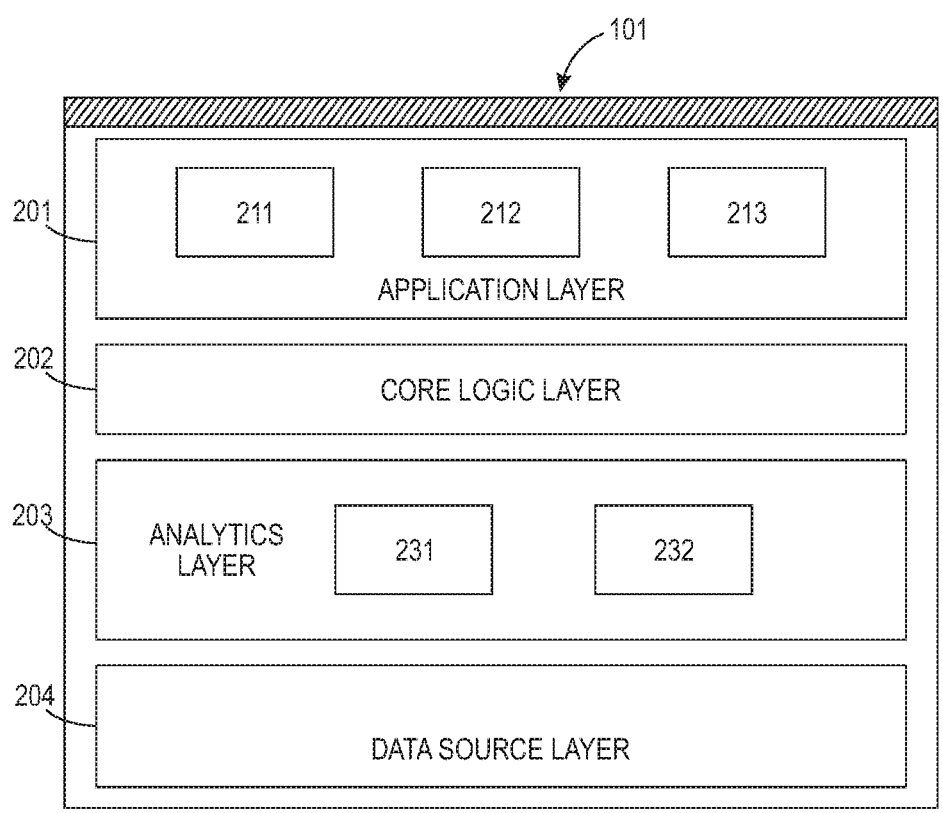
FIG. 2 illustrates a block diagram of an example architecture of the automated booking system, according to an embodiment.

FIG. 2 illustrates a block diagram showing an example architecture of the automated booking system 101 shown in FIG. 1. As will be appreciated by one skilled in the art, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. The provisioning of the system functionality may be divided between one or more servers and/or various end-user devices such as, without limitation, an electronic device of a commuter, a user interface of an on-demand service vehicle, an MMTP service, and/or an on-demand service provider. In an embodiment, the automated booking system 101 of the commuter may include a booking application that is configured to cause an electronic device to perform some or all of the on-demand service booking related functions that are described in this disclosure. The booking application may include virtually any application type which may run on any underlying operating system or platform, and may be installed on an electronic device. The installed booking application may register itself with the electronic device's operating system allowing the application to monitor certain activities on the electronic device's operating system, and using the functionalities of the operating system. The booking application may be a local application which executes on the electronic device. Alternatively, the booking application may be a web application, which executes on a remote application server. That is, the booking application may include any application functionality which is accessed by the user over a network and experienced locally as application e.g., using a browser running on the electronic device. Techniques for executing such a web application, and related technology, are well known in the art and are therefore not described further in detail herein, except as may be helpful or necessary to understand operations of the system. In other embodiments, the booking application may include both local and web (remote) elements.

In an embodiment, the system 101 may include a four-tier architecture, supported by software and hardware systems that can include centralized computer-based and communications-based hardware systems or a distributed network of such systems. For example, at least of the four-tier architecture may reside on a mobile device (as discussed above with respect to FIG. 1). The four-tier architecture may include an application layer 201, a core logic layer 202, an analytics layer 203, and storage layer 204. The application layer 201 provides, in part, the user interface. The core logic layer 202 provides problem solving ability to the system. The analytics layer 203 analyzes data from a plurality of sources, and the data source layer 204 stores and manages data for the operation of the automated booking system.

The application layer 201 provides an interface to the users to input queries and user preferences, and also to display the list of on-demand transportation, automated booking results and other analytical results. The application layer 201 enables data visualization, data manipulation and data entry. The end user views information through a suitable interface. Preferably, suitable interfaces may be provided through a wide variety of electronic systems, including without limitation, mobile devices and other computing devices. The application layer 201 may include an input interface 211 for user management, such as for registration of commuters and on-demand service providers. The system may receive, from commuters, initial preferences about service providers, cost preferences, wait time restrictions, selection of an on-demand service provider from a shortlist of available providers, or the like, via interface 211. The system may also receive preferences from on-demand service providers, via interface 211, such as the routes, locations and times. The application layer 201 may also include an output interface 212 for presenting available on-demand transportation service options at transfer points of the MMTP trips and/or confirmation of a booking for an on-demand transport service. The system may also provide analytical information to other users such as, without limitation, on-demand transportation service providers and city planning agencies via the output interface 212. Examples of such analytical information may include, without limitation, routes that are popular for booking (demand) on-demand services, times slots that are popular for booking (demand) on-demand services, preferred vehicle types, cost analytics, or the like.

In an embodiment, application layer 201 may also include a booking interface 213 for automatically booking an on-demand service.

In an embodiment, the core logic layer 202 receives data from application layer 201 and connects and queries the storage layer 204 and/or the analytics layer 203, to support various functionalities provided by application layer in real-time. In an embodiment, the core logic layer 202 may include a rule set for determining an optimal time of booking an on-demand transport service in a trip such that a linear combination of the on-demand service and commuter waiting times are minimized. The core logic layer 202 may also include a rule set for predicting the arrival time of a commuter at a particular location.

In an embodiment, the analytics layer 203 includes analytic modules of the system that use the historical data gathered by the system over a period of time. Some of the analytics without limitation, a commuter profiling module 231 and a location profiling module 232. The location profiling module 232 receives data about transfer points of interest and may determine location profile information such as on-demand service availability at a point of interest, traffic profile of routes that connect to this transfer point at different times, commuter demand for on-demand services at the point of interest, or the like. The commuter profiling module 232 receives data about a commuter and may analyze it to determine her trip patterns and preferences. For each commuter, this module may analyze information such as the routes on which she takes trips, her waiting time preferences, times during which the trips are taken, type of vehicles she chooses, kind of co-passengers, etc. to build a commuter profile. In addition, based on the trip plans previously chosen by the commuter, the module may determine unspecified preferences as well, to provide a personalized and seamless automation in on-demand transport booking for the commuter.

In an embodiment, the data source layer 204 may include various formats of data, received from and/or stored in at least one database or in various geographically distributed databases. Data sources may include, without limitation, commuter profile data source, location profile data source, map databases, MMTP data source, social networking sites, data sources associated with transit agencies (such as bus lines, train lines, airlines, or the like), data sources associated with on-demand transport service providers, that provide data relating to transport modes and associated data (such as navigation data from one or more vehicles), up-to-date service schedules, live feeds, weather monitors, and traffic monitors. In an embodiment, the data sources may be one or more sensors that are configured to monitor the state of a transportation the state of a transportation system. For example, the sensors may be global positioning system (GPS) sensors that are disposed on various vehicles, such as a train or a bus, to track the position of the vehicle. The live feeds may include information regarding the live location data for public transport (such as bur, train, etc.) and on-demand service transport, status of road traffic, accidents, planned and/or unplanned maintenance of roads, weather changes, ground and air mass transit schedules, and other information. The data sources may also include location tracking services for tracking the location of a commuter, such as a GPS of the commuter's mobile device or of a vehicle the commuter is travelling in. The data source layer 204 may include a data storage interface (or a cache) to help reduce bandwidth consumption and system load, and improve the speed efficiency.

Figure 3:
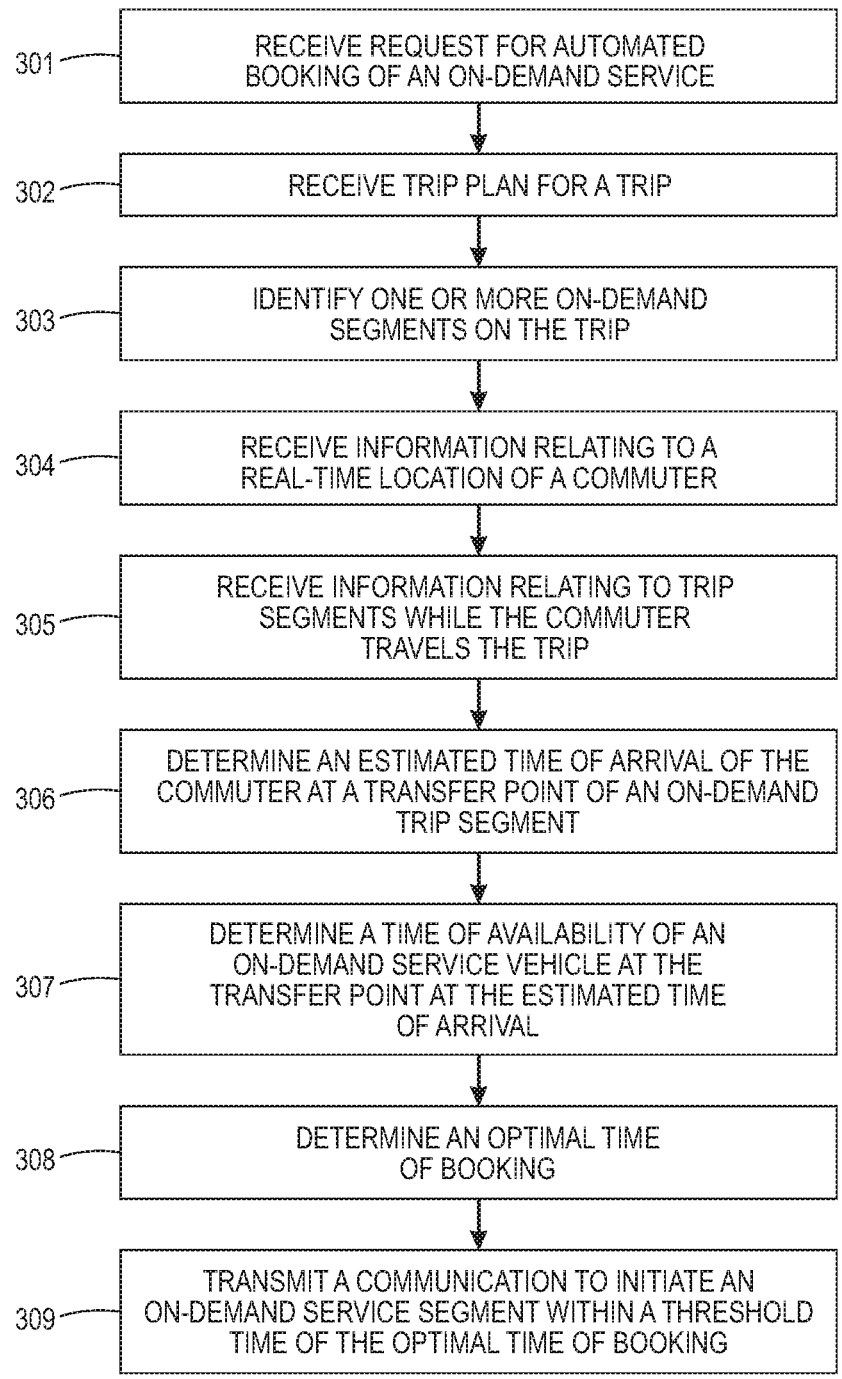
FIG. 3 depicts a flowchart illustrating an example method for automated booking of on-demand transportation services in a multi-modal trip, according to an embodiment.

FIG. 3 illustrates a flowchart for an example method for automatic booking of on-demand transportation services in a multi-modal trip for a commuter. As shown in FIG. 3, the system may receive 301 a request for automated booking of an on-demand service. In an embodiment, a commuter may register with the automated booking system, and the system may continuously monitor a device associated with the registered commuter to provide the automated booking functionality whenever the commuter requests a multimodal trip plan from an MMTP and/or travels a multimodal trip. The system may also analyze travel patterns of a commuter based on a commuter profile (discussed below) to provide the automated booking functionality at an appropriate time. In another embodiment, the system may synchronize with the calendar application of an electronic device of a commuter to determine the need for an on-demand service and provide the automated booking functionality at an appropriate time. Alternatively and/or additionally, a commuter may send a request for automated booking of on-demand services on a multimodal trip.

In an embodiment, the system may also receive commuter preferences for the on-demand service in association with the request. Examples of commuter preferences may include, without limitation, preferred on-demand service providers (based on quality, cost, punctuality, fairness etc.), cost of the service, waiting charges per unit time, preferred wait times, type of an on-demand vehicle, types of co-passengers, or the like. In an embodiment, the system may automatically identify commuter preferences based on a commuter profile of the requesting commuter. The system may create a commuter profile by automatically learning at least some of the user preferences, based for example on explicitly indicated preferences, on selection among list of possible on-demand service providers, on feedback and/or on observations during the journeys. For example, a commuter profile may include information learned by the system based on past actions of the commuter such as, without limitation, preferences provided by a commuter (during registration and/or past requests for on-demand services), selections made by a commuter, reviews provided by a commuter, travel patterns of a commuter (routes on which the commuter frequently travels, times during which the commuter travels, etc.), or the like.

Figure 4:
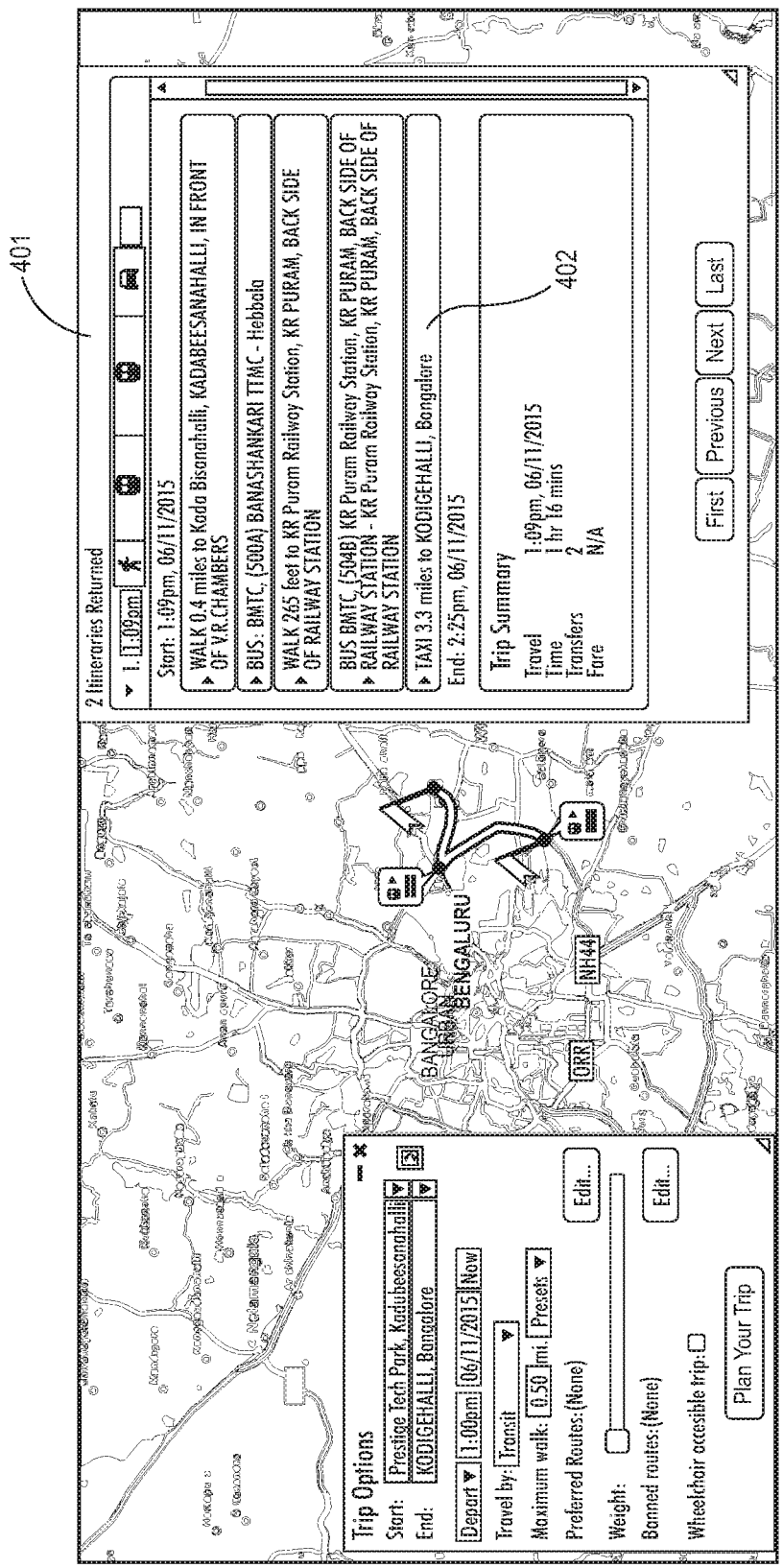
FIG. 4 depicts an example trip plan for a commuter, according to an embodiment.

In response to receiving the request for automated booking of an on-demand service, the system may receive 302 a trip plan from an MMTP and/or from an electronic device of a user. FIG. 4 illustrates an example trip plan 401 for a commuter that includes an on-demand service segment. The live feeds may include information regarding the live location data for public transport (such as bur, train, etc.) and on-demand service transport, status of road traffic, accidents, planned and/or unplanned maintenance of roads, weather changes, ground and air mass transit schedules, and other information 402.

Returning to FIG. 3, in an embodiment, the system may identify 303 one or more on-demand service segments in the trip plan. An on-demand service segment is a part of a trip that requires an on-demand service vehicle as the mode of transport. In an embodiment, the system may also identify the transfer points and end points associated with each on-demand service segment.

In an embodiment, the system may receive real-time information 304 relating to a location of the commuter while the commuter travels the trip. The system may receive the location information from, without limitation, a location sensor associated with a mobile device of the commuter that the commuter is carrying on the trip (such as a GPS, accelerometer, beacons, or the like or a commuter's mobile device), a location sensor of a vehicle that the commuter has traveled on and/or is travelling on during the trip (such as a GPS of a vehicle), and/or a location database of a transit agency (such as a tracking database of a bus system, a train system, an airline system, or other public transportation systems), or other location tracking databases of the transportation network that can track the location of a vehicle that the commuter has traveled on and/or is travelling on during the trip.

The system may also receive information 305 relating to the trip segments while the commuter travels the trip by monitoring the transportation network. Examples of such information may include, without limitation, route information from a map database, traffic alerts from traffic monitors on the commuter's trip, weather forecasts from weather monitors, road closures relating to the trip, real-time. In addition to location-based tracking, the system may have access to transportation schedules for the vehicles (e.g., bus and train schedules) and may communicate with other services which track the current locations of the vehicles (e.g., a taxi dispatcher service, a public transportation monitoring service, etc.) and which track current transportation conditions (e.g., traffic conditions for cars, on-time conditions for trains and buses, etc.).

In an embodiment, the system may determine 306 an estimated time of arrival of the commuter at a transfer point of an on-demand service segment during the trip. In an embodiment, the system may use the real-time location of the commuter and the information relating to the trip to determine an estimated time of arrival of the commuter at the transfer point. For example, the system may use factors such as a distance of the commuter from the transfer point based on the commuter's location, a speed of travel of the commuter based on the information received relating to the trip segments, and/or consider other predictive features relating to a route (such as traffic, mode of transport) to determine an estimated time of arrival. In an embodiment, the system may assign weights to various factors, learned from historical arrival time information (for e.g., by minimizing the mean-squared prediction error) to determine the estimated arrival time of the commuter. In an embodiment, the system may determine the estimated time of as a random variable "T" associated with a known and/or unknown distribution function. Alternatively and/or additionally, the system may determine the estimated time of arrival based on the distance and the speed of travel as a random variable "T" associated with a time-varying stochastic function.

In an embodiment, the system may determine 307 a time of availability (S(t) of an on-demand service vehicle for the commuter to begin the on-demand service segment at the transfer point, as a function of a time of booking (t). In an embodiment, to determine the time of availability, the system may identify one or more preferred on-demand service providers and/or vehicles that satisfy some or all of the commuter preferences for the on-demand service providers. The system may then query the preferred on-demand service providers and/or vehicles to identify one or more on-demand service vehicles that will be available (i.e., can transport the commuter from the transfer point to the end point of the on-demand service segment) at the transfer point based on the estimated time of arrival of the commuter at the transfer point. The system may specify a time interval that includes the estimated time of arrival of the commuter at the transfer point in the query for availability of the preferred on-demand service providers and/or vehicles.

The system may present the identified one or more on-demand service vehicles (and associated information such as on-demand service provider identity, cost, or the like) to the commuter and receive a selection of an on-demand service vehicle and/or provider. In an embodiment, the system may rank the identified preferred on-demand service providers and/or vehicles based on the number of commuter preferences they satisfy (as determined by comparing characteristics of the service provider to characteristics such as preferences in the commuter profile). In an embodiment, the system may store the received selection in a commuter profile for automatic learning of commuter preferences.

Alternatively and/or additionally, the system may automatically select an on-demand service vehicle and/or provider based on commuter preferences, commuter profile, and/or other rules such as minimum cost, minimum wait time, or the like.

The system may identify the time of availability of the selected on-demand service vehicle at the transfer point, as a function of a time of booking. The system may identify the time of availability based on a real-time location of an on-demand service vehicle, information relating to the transportation network, information relating to a direction of travel of the on-demand service vehicle, or the like.

The time of availability of an on-demand service vehicle at the transfer point may be a deterministic function of the time of booking. Alternatively and/or additionally, the time of availability of the on-demand service vehicle at the transfer point, may be a time dependent stochastic function.

In an embodiment, the system may determine 308 an optimal time of booking each selected on-demand service vehicle based on the estimated time of arrival and the time of availability for the on-demand service vehicle. In an embodiment, the optimal time of booking minimizes the total expected cost of waiting, which is the sum of the cost of waiting for the commuter and the cost of waiting for the on-demand service vehicle, at the transfer point. It will be understood to those skilled in the art that other functions may be optimized to determine the optimal time of booking without deviating from the principles of the current disclosure.

In an embodiment, the system may determine the optimal booking time based on the assumptions that: (1) there is exactly one on-demand vehicle that is always available and the time of availability S(t) of this vehicle is a deterministic function of time of booking, i.e., S(t) is a deterministic function of the time of booking, and (2) the arrival time distribution function F(T<u) of the commuter is known and does not vary with time, i.e., F(T) is also a deterministic function (where T is a random variable). Let the per unit cost of waiting time of the commuter be "h," and let the per unit cost of waiting time of the transportation service be "b."

For, total expected waiting time cost is $$E_T[b(T-S(t))_+ + h(S(t)-T)_+] =$$

$$\sum_{u=0}^{\infty} \mathbb{P}(T=u)(b(u-S(t))_+ + h(S(t)-u)_+) =$$

$$h\sum_{u=0}^{S(t)-1} \mathbb{P}(T=u)(S(t)-u) + b\sum_{u=S(t)}^{\infty}(u-S(t)).$$

At the optimal booking time t*, the above function is flat. Assuming, the cost at t* to be S(t*), the cost S(t*)+1 will be the same (since the slope in the neighborhood of this point will be smaller than min(b, h)). Thus, by equating the two costs:

$$h\sum_{u=0}^{S(t^*)-1} \mathbb{P}(T=u)(S(t^*)-u) + b\sum_{u=S(t^*)}^{\infty} \mathbb{P}(T=u)(u-S(t^*)) =$$

$$h\sum_{u=0}^{S(t^*)-1} \mathbb{P}(T=u)(S(t^*)-u) + b\sum_{u=S(t^*)+1}^{\infty} \mathbb{P}(T=u)(u-S(t^*)-1)$$

$$\Rightarrow b\sum_{u=S(t^*)+1}^{\infty} \mathbb{P}(T=u) = h\sum_{u=0}^{S(t^*)} \mathbb{P}(T=u),$$

$$\Rightarrow \sum_{u=0}^{S(t^*)} \mathbb{P}(T=u) = \frac{b}{b+h}$$

$$\Rightarrow S(t^*) = F^{-1}\left(\frac{b}{b+h}\right)$$

$$\Rightarrow t^* = S^{-1}\left(F^{-1}\left(\frac{b}{b+h}\right)\right)$$

The following pseudo-code illustrates an example method of determining 308 an optimal time of booking an on-demand service vehicle when T is a random variable with known distribution function and S(t) is deterministic and invertible, according to an embodiment.

```
Result: A confirmation of booking the on-demand transportation
Given: F(u) = ℙ(T < u); S(t); Waiting costs b and h;
Set: t = 0; notBooked = True; t* = S⁻¹(F⁻¹(b/(b+h)));
while notBooked is True do
|    if t* ≤ t ≤ T^realized + c then
|    |    notBooked, confirmation = BookTransportation();
|    end
|    if notBooked is False or t > T^realized + c then
|    |    Break;
|    end
|    t += 1;
end
```

Thus, the optimal booking time may be determined to be $t = S^{-1}(F^{-1}(\frac{b}{b+h}))$ by letting S: $\mathbb{R} \to \mathbb{R}$ be an invertible function, and it minimizes the total cost $E_T[b(T-S(t))_+ + h(S(t)-T)_+]$. The system may then attempt to book an on-demand service vehicle at all times starting from t* up to time $T_{realized} + c$ ($T_{realized}$ is the time when the arrival event actually happens and c>0 is a pre-defined buffer time). The first time the system succeeds in making the booking, it breaks the loop.

In an alternate embodiment, the waiting cost of function of the on-demand service provider may not be linear. For example, the service provider may allow for some fixed period of waiting where there is no cost of waiting and then the cost is assumed linear in the waiting time. Thus, conditional on S(t)<T, the cost b(T−S(t)−α)+(where α>0) is the waiting time limit of the service provider for which it will not charge the commuter. The system may thus determine the optimal booking time by minimizing $E_T[b(T-S(t)-\alpha)_+ + h(S(t)-T)_+]$.

In yet another embodiment, the system may determine the optimal booking time based on the assumptions that: (1) S(t) is a discrete stochastic process (because (a) the service start time S(t) may itself be a random variable that may depend on exogenous factors like traffic and congestion, and (b) if a service is available at time $t_1$, then it may not be available at time $t_2 > t_1$), and (2) the arrival time distribution function F(T<u) of the commuter is known and does not vary with time, i.e., F(T) is a deterministic function.

Assuming, $S(t)=t+\Delta$, where $\Delta \sim Cat(K, p)$ such that $\Delta$ is a random variable that is drawn according to a categorical distribution. $\Delta$ may take K different values (say $\Delta^1, \ldots, \Delta^K$) according to the K-dimensional parameter vector $p = (p_1, \ldots, p_K)$ (with $\Sigma_{i=1}^K p_i = 1$).

Also assuming, that S(t)–t is a sequence of independent and identically distributed random variables. The "service not available" response may be subsumed by setting one of the elements of the support (say $\Delta^K$) very high in the representation of S(t).

Let G be the distribution function of the derived random variable T–$\Delta$. If the time of booking $$t = G^{-1}\left(\frac{b}{b+h}\right),$$

then the expected total waiting time $\mathbb{E}_T, \Delta[b(T-S(t))_+ + h(S(t)-T_+)]$ is minimized. Substituting, S(t) with t+$\Delta$ and rearranging the terms, the following is obtained:

$$\mathbb{E}_{T,\Delta}[b(T-S(t))_+ + h(S(t)-T_+)] = \mathbb{E}_{T,\Delta}[b((T-\Delta)-t)_+ + h(t-(T-\Delta))_+] \quad (1)$$

Since the distribution functions of $\Delta$ and T are known, the distribution function G of the derived random variable T–$\Delta$ may be derived. The system may determine that an on-demand service booked at t* will ensure minimum expected total cost to the commuter.

The following pseudo-code illustrates an example method of determining 308 an optimal time of booking an on-demand service vehicle when T is a random variable with known fixed distribution function and $\Delta$=S(t)–t is i.i.d. categorically distributed with fixed known parameter p, according to an embodiment.

---

Result: A confirmation of booking the on-demand transportation
Given: $G(u) = \mathbb{P}(T - \Delta < u)$; Waiting costs b and h;

Set: t = 0; notBooked = True; $t^* = G^{-1}\left(\frac{b}{b+h}\right)$;
while notBooked is True do
|   if $t^* < t < T^{realized} + c$ then
|   |   notBooked, confirmation = BookTransportation();
|   end
|   if notBooked is False or $t > T^{realized} + c$ then
|   |   Break;
|   end
|   t += 1;
end

---

In yet another embodiment, the system may determine the optimal booking time based on the assumptions that the distributions of both T and S(t) vary with time. Hence, estimated arrival time also depends on the time of booking, i.e., the distribution function $F_t$ depends on time t. Assuming a prior distribution function $F_{-1}$, in an embodiment, the system may start querying the appropriate on-demand service using function queryETA( ) to get the commuter arrival time estimates $\tilde{T}_t$ at times t=0, 1, 2, . . . . The system may then compute posterior $F_t$ given previous distribution $F_{t-1}$ and a new sample $\tilde{T}_t$ using Bayesian inference.

Also assuming, an independent and/or dependent service time availability process $S(t)=t+\Delta(t)$, where $\Delta(t) \sim Cat(K, p_t)$, and a prior distribution function $Q_{-1}$, the system may query service availability time estimates $\tilde{S}_t^-$ at time t=0, 1, 2, . . . using function query-ServiceAvailabilty( ) and update $Q_t$s accordingly. In an embodiment, the system may use a function updateDistribution( ) to do the updating.

At every time step t, after the system updates the distributions of arrival times and service availabilities, it may compute distribution function $G_t$ using method getDistribution( ). The system may then use this function to compute the optimal booking time $w^*_t$ according to Equation (1). If the distributions $F_t$ and $Q_t$ (and consequently, Gt) never change, then $w^*_t$ is the same for all t and when $t=w^*_t$, the system may start attempts to book the on-demand service. Alternatively, since $w^*_t$ can be different from the previously computed optimal booking times, the system maintains a set $S_t$ of good optimal booking times. The system may then add $w^*_t$ to $S_{t-1}$ and remove those booking times which were computed using distributions Fu and $Q_u$ (u≤t) that are very different from the current distributions $F_t$ and $Q_t$ (this is measured using the 'total variation' distance measure or any other suitable measure). Finally, if t is equal to one of the elements of $S_t$, then the system may attempt to book. It may happen that $\Delta = \Delta^K$ (meaning the service is not available) at this time point. If so, the system will attempt to book at times t+1, t+2, . . . up to time $T^{realized}+c$, as discussed above.

The following pseudo-code illustrates an example method of determining 308 an optimal time of booking an on-demand service vehicle when the distributions of both T and S(t) vary with time, according to an embodiment. The system computes a set of optimal booking times based on intelligent updates of the distributions of arrival and resource availability times.

---

Result: A confirmation of booking the on-demand transportation
Given: $F_{-1}(u) = (T \le u)$; $Q_{-1}(v) = \mathbb{P}(\Delta(-1) \le v)$; Waiting costs b and h;
Set: t = 0; notBooked = True; $S_{-1} = \varphi$;
while notBooked is True do
|   $\hat{T}_t$ = queryETA(t); $\hat{S}_t$ = queryServiceAvailability(t);
|   $F_t$ = updateDistribution($F_{t-1}, \hat{T}_t$); $Q_t$ = updateDistribution($Q_{t-1}, \hat{S}_t - t$);

|   $G_t$ = getDistribution($F_t, Q_t$); $w^*_t = G_t^{-1}\left(\frac{b}{b+h}\right)$;

|   $S_t = S_{t-1} \cup \{w_t^*\}$;  //Adding new optimal booking time
|   $Q_t = \{w_u^* \epsilon S_t : \|F_t - F_u\|_{tv} \ge_{\epsilon F}$ or $\|Q_t - Q_u\|_{tv} \ge_{\epsilon Q}\}$;
|   if $t \ge \min(S_t \backslash Q_t)$ then
|   |   notBooked, confirmation = BookTransportation();
|   end
|   if notBooked is False ot $t > T^{realized} + c$ then
|   |   Break;
|   end
end

---

The following illustrates methods for determining an optimal booking time and the associated cost savings using the following three examples. For each illustrative example, the total cost of waiting (for the commuter and the on-demand service) is minimized to determine the optimal booking time.

Example 1

Assuming, the estimated arrival time distribution as a discrete truncated approximation of a normal distribution with mean 100 minutes and deviation 20 minutes (truncation is performed to includes resulting discrete arrival time distribution from 70 minutes to 130 minutes). Also assuming, that the service availability model is deterministic and linear in booking time: $S(t)=t+\Delta$, where $\Delta=10$ minutes, optimal booking times for three settings: (a) user waiting cost h is greater than the service waiting cost b, (b) h is equal to b, and (c) h is less than b, were determined.

Figure 5:
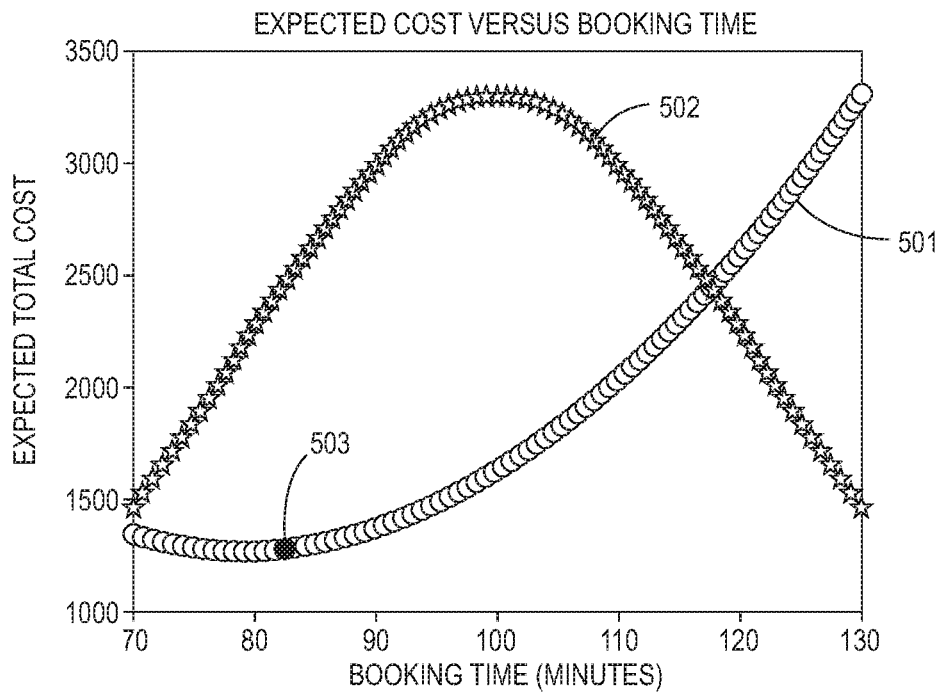
FIG. 5 illustrates a plot for expected cost of booking versus time and an optimal booking time, when the estimated time of arrival is associated with a known distribution function and the availability of the on-demand service is a deterministic function of the time of booking (when the cost of waiting for the commuter is more than the cost of waiting for the on-demand service), according to an embodiment.
Figure 6:
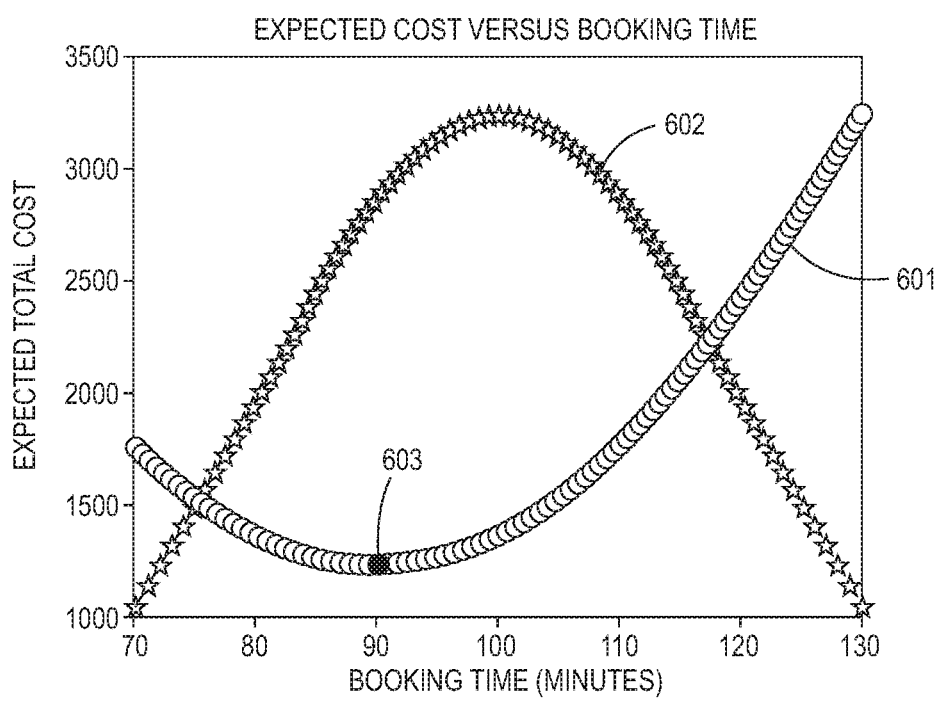
FIG. 6 illustrates a plot for expected cost of booking versus time and an optimal booking time, when the estimated time of arrival is associated with a known distribution function and the availability of the on-demand service is a deterministic function of the time of booking (when the cost of waiting for the commuter is approximately equal to the cost of waiting for the on-demand service), according to an embodiment.
Figure 7:
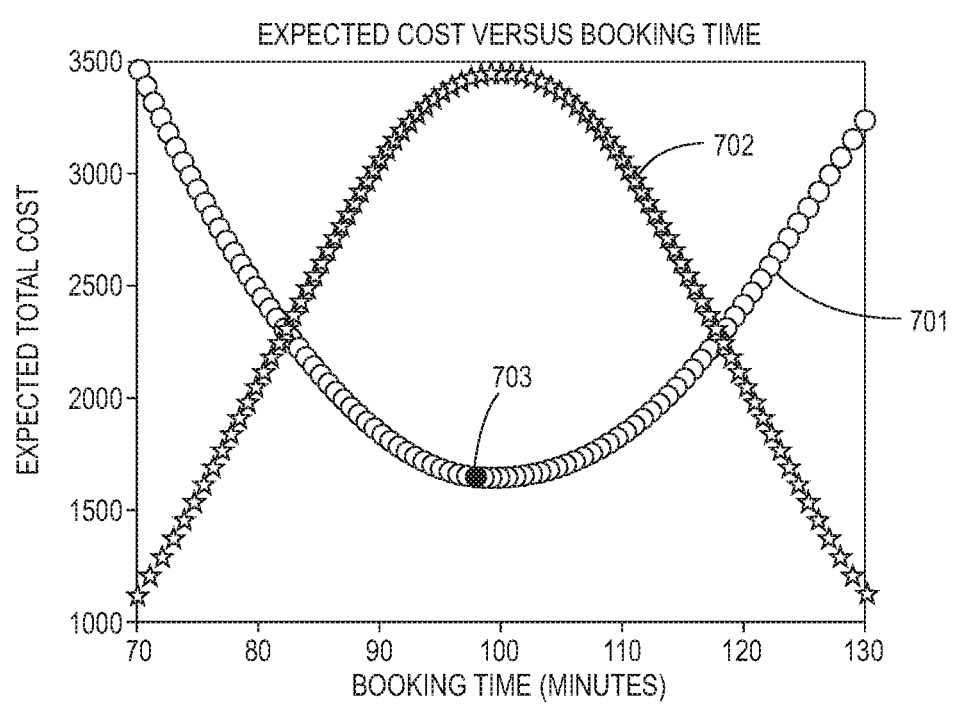
FIG. 7 illustrates a plot for expected cost of booking versus time and an optimal booking time, when the estimated time of arrival is associated with a known distribution function and the availability of the on-demand service is a deterministic function of the time of booking (when the cost of waiting for the commuter is less than the cost of waiting for the on-demand service), according to an embodiment.

FIGS. 5, 6, and 7 illustrate the cost savings achieved by booking an on-demand service vehicle for the above three settings at the determined optimal time, as compared to booking at any other time. The above figures plot the expected cost of booking (solid curves 501, 601, and 701) versus the booking time. In each of the above figures, the dotted curves (502, 602, and 702) represent the arrival time distribution, and points 503, 603, and 703 represent the optimal times of booking (corresponding to the minima on curves 501, 601, and 701) in each of the above settings.

As shown in FIG. 5, the per unit cost of waiting for a commuter is twice the per unit cost of waiting for an on-demand service. Hence, the optimal time to book 503 is much earlier than usual (i.e., earlier on the curve 501) so as to ensure that the on-demand service will arrive at the transfer point of the on-demand segment deterministically before the estimated arrival time of the commuter.

As shown in FIG. 6, the per unit cost for waiting for a commuter is approximately equal to the per unit cost for waiting for an on-demand service. Hence, the optimal booking time 603 is the time such that the on-demand service reaches the transfer point at the estimated arrival time of arrival of the commuter.

As shown in FIG. 7, the per unit cost for waiting for a commuter is less than the per unit cost for waiting for an on-demand service. Hence, the optimal time to book 703 is much later than usual so as to ensure that the on-demand service will arrive at the transfer point at and/or after the estimated arrival time of the commuter.

Example 2

Figure 8:
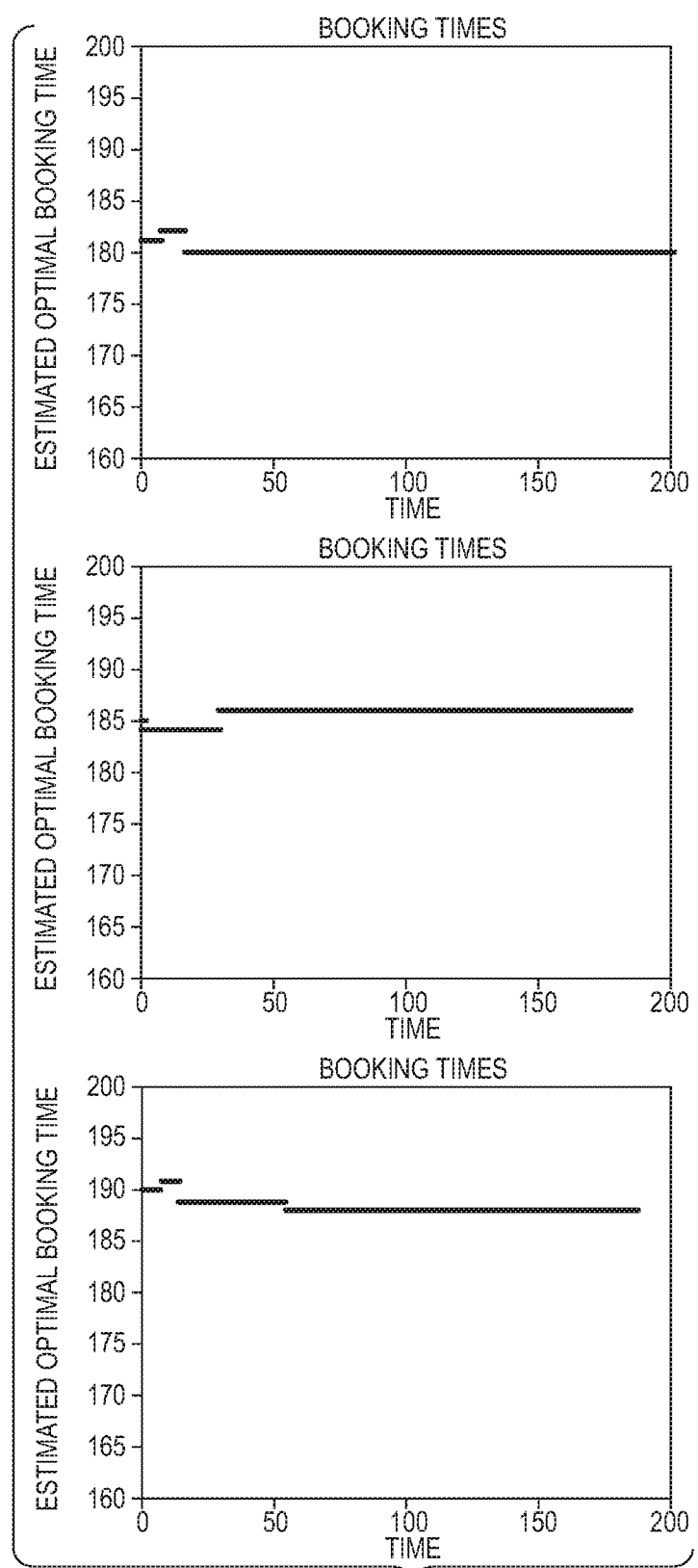
FIG. 8 illustrates plots for expected cost of booking versus time and an optimal booking time, when the estimated time of arrival is associated with a fixed but unknown distribution function and the availability of the on-demand service is a fixed unknown stochastic function of the time of booking according to an embodiment.

When the distributions of arrival and service availability are not known a priori. Instead, assuming (uniform) prior distributions of arrival and service availability, the system receives realizations from the true unknown distributions. The true arrival distribution is assumed to be discrete truncated normal with the same parameters as Example 1. The service availability times are also assumed similar to the arrival distribution of Example 1, but with mean of 15 minutes and deviation of 5 minutes. Optimal booking times for three settings: (a) user waiting cost h is greater than the service waiting cost b, (b) h is equal to b, and (c) h is less than b, were determined and were found to be close to optimal. The results were verified over 30 Monte Carlo runs. FIG. 8 illustrates optimal booking times as a function of time for Example 2.

Example 3

Figure 9A:
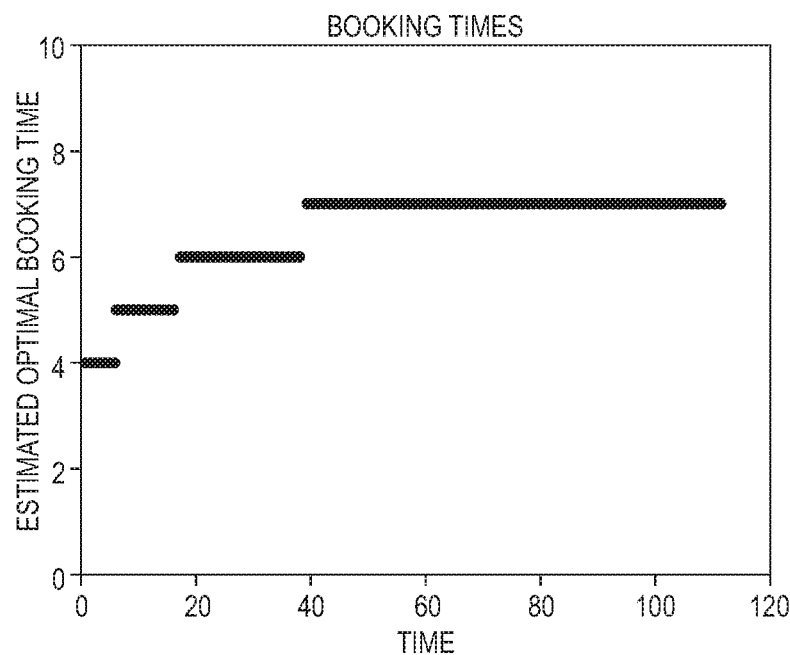
FIG. 9A illustrates a plot for optimal time of booking versus time and an optimal booking time when the estimated time of arrival and the availability of the on-demand service are unknown stochastic functions of the time of booking, according to an embodiment.
Figure 9B:
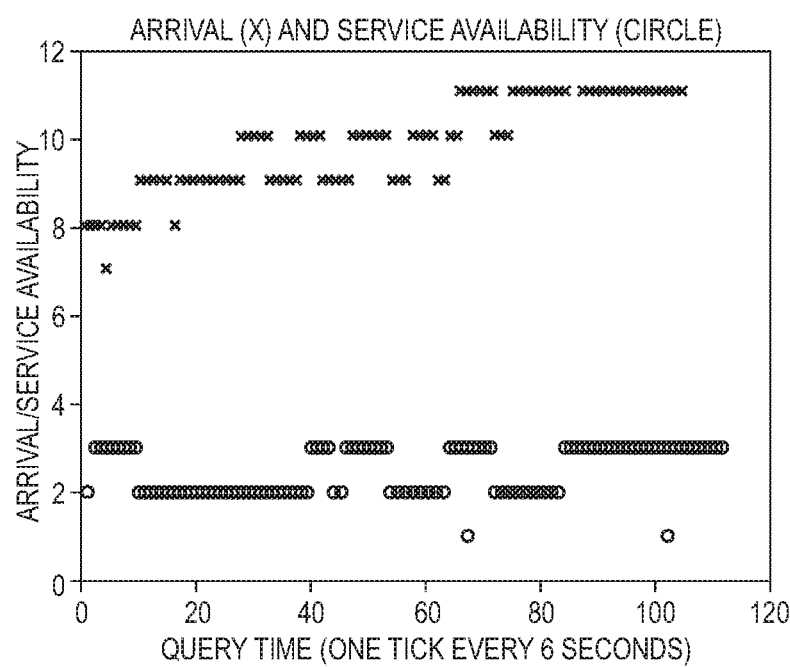
FIG. 9B illustrates a plot for estimated arrival times and on-demand service availability time (versus time), according to an embodiment.

The system determined optimal booking times for a ride sharing service by retrieving data relating to the estimated time of arrival estimates for a public transit service. In this case, the public transit service is the Boston Logan Airport to South Station (direction: South Station) bus on Jan. 23, 2016 (2:59 pm-3:10 pm EST). The system also determined a ride sharing service availability in the same time period with South Station as the transfer point. FIG. 9A shows the received logs plotted as a function of time. Assuming user waiting cost is the same as service waiting cost, FIG. 9B illustrates the optimal booking times plotted as a function of query time. As shown in FIG. 9B, the optimal booking times change as the system receives real-time updates about the location of the bus and/or the ride sharing service. For example, if the bus is delayed, the optimal booking time is adjusted accordingly and earlier calculated booking times are eliminated to counter this change in the arrival times.

It will be understood to those skilled in the art that the system may also minimize the total cost of waiting for multiple commuters who may share an on-demand service on a multimodal trip segment, using the principles discussed above, to determine an optimal booking time. In an embodiment, the system may book an on-demand service at the optimal booking time such that the weighted sum of waiting times of all parties involved (multiple commuters and on-demand services) is minimized. It will be understood to those skilled in the art that other objective functions may be optimized to determine the optimal booking time without deviating from the principles of the disclosure.

Referring back to FIG. 3, in step 309, the system may transmit a communication to initiate the on-demand service segment within a threshold time of the optimal booking time. In an embodiment, the system may transmit a communication to the selected on-demand service vehicle and/or an on-demand service provider associated with the vehicle to automatically book the service. The transmitted communication may include information such as, without limitation, the transfer point of the on-demand segment, the end point of the on-demand segment, the trip plan, the estimated time of arrival, a commuter identification, payment details, commuter preferences, or the like. The system may receive a confirmation of the booking from the selected on-demand service vehicle and/or an on-demand service provider, and may transmit the conformation to the commuter.

In an alternate embodiment, the system may transmit a communication to an electronic device of the commuter, and the commuter may make the booking, if desired. In an embodiment the transmitted communication may include information such as, without limitation, identification and booking process for the selected on demand vehicle and/or service, cost of service, the optimal time of booking, the estimated time of arrival the transfer point of the on-demand segment, the end point of the on-demand segment, or the like. The system may receive a confirmation of the booking from the selected on-demand service vehicle and/or an on-demand service provider, if the commuter completes the booking. In an embodiment, the system may store a commuter preference based on whether or not the commuter completes the booking in a commuter profile.

It will be appreciated that once a booking has been completed, notification is provided to other entities as well such as the MMTP planner.

In an embodiment, the system may create a location profile for transfer points of on-demand segments identified in one or more trips undertaken by one or more commuters in a transportation network. The system may create the location profile by automatically learning and storing information corresponding to a transfer point during the automated booking of on-demand services for the transfer point in one or more trips undertaken by one or more commuters (i.e., historical data collection). Examples of information corresponding to a transfer point may include, without limitation, commuter demand for a type of on-demand service at the transfer point, on-demand service availability at the transfer point, traffic profile of routes that connect to the transfer point at different times, types of commuters at the transfer point, or the like.

In an embodiment, the system may use the location profile for a transfer point to provide recommendations to commuters, on-demand service providers, transport agencies, or the like. For example, the system may determine, based on a location profile of a transfer point, that on-demand services will not be available at a transfer point for an upcoming trip of a commuter travelling at the estimated time of arrival. The system may recommend to the commuter that he should avoid a route that includes the transfer point and may also provide alternate route recommendations. Similarly, the system may identify transfer points or segments in MMTP trip plans that have a high demand for on-demand modes of transport, and may recommend to a transport agency that it should add a public mode of transport for the identified transfer point or the segment. The system may also recommend to an on-demand service provider that it should add more on-demand service vehicles for the identified transfer point or the segment. Alternatively, the system may provide location profile information and/or recommendations to on-demand service providers for efficient allocation of resources (on-demand vehicles) in the transportation network.

Figure 10:
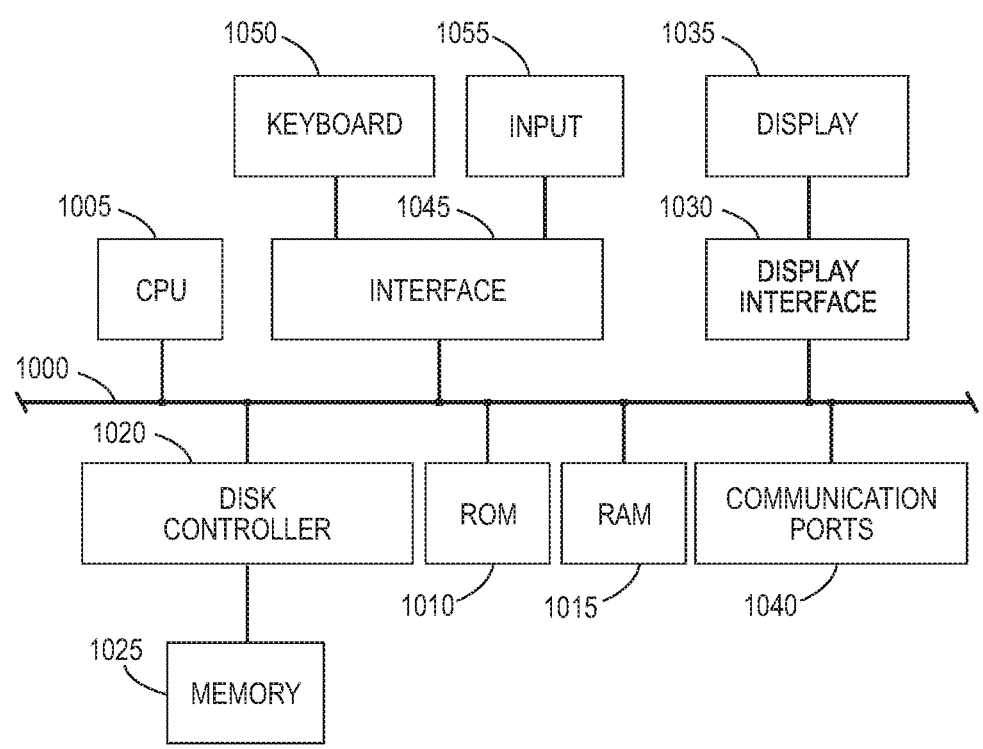
FIG. 10 depicts various embodiments of a computing device for implementing the various methods and processes described herein.

The optimal booking time determination algorithms and analysis techniques as described above may be performed and implemented by one or more computing devices located at one or more locations. FIG. 10 depicts a block diagram of various hardware that may be used to contain or implement the various computer processes and systems as discussed above. An electrical bus 1000 serves as the main information highway interconnecting the other illustrated components of the hardware. CPU 1005 is the central processing unit of the system, representing a processor (which may be a single processing device or multiple processing devices) performing calculations and logic operations required to execute a program. CPU 1005, alone or in conjunction with one or more of the other elements disclosed in FIG. 10, is a processing device, computing device or processor as such terms are used within this disclosure. Read only memory (ROM) 1010 and random access memory (RAM) 1015 constitute examples of memory devices.

A controller 1020 interfaces with one or more optional memory devices 1025 to the system bus 1000. These memory devices 1025 may include, for example, an external or internal DVD drive, a CD ROM drive, a hard drive, flash memory, a USB drive or the like. As indicated previously, these various drives and controllers are optional devices. Additionally, the memory devices 1025 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 1010 and/or the RAM 1015. Optionally, the program instructions may be stored on a tangible computer readable medium such as a compact disk, a digital disk, flash memory, a memory card, a USB drive, an optical disc storage medium, a distributed storage medium such as a cloud-based architecture, and/or other recording medium.

A display interface 1030 may permit information to be displayed on the display 1035 in audio, visual, graphic or alphanumeric format. Communication with external devices may occur using various communication ports 1040. A communication port 1040 may be attached to a communications network, such as the Internet or a local area network.

The hardware may also include an interface 1045 which allows for receipt of data from input devices such as a keyboard 1050 or other input device 1055 such as a mouse, a joystick, a touch screen, a remote control, a pointing device, a video input device and/or an audio input device.

As described herein, the processes and techniques, whether utilized alone or in some combination, provide specific functionality to improve upon the existing processes in a public transportation network. However, it should be noted that a public transportation system is described above by way of example only. The processes, systems and methods as taught herein may be applied to any environment where route analysis is provided to determine a listing of short and efficient routes for traveling through a network, and the algorithms and extensions as described herein may be altered accordingly based upon the transportation network being analyzed to improve reliability.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A method for automated booking of an on-demand service in a multimodal journey, the method comprising:
   receiving, by a processing device, information related to a multimodal trip plan in a transportation network associated with a trip of a commuter, wherein:
      the multimodal trip plan comprises a plurality of segments, and
      the plurality of segments include an on-demand service segment that requires an on-demand service vehicle as the mode of transport;
   receiving, from one or more location tracking sensors, real-time information relating to a location of the commuter while the commuter travels the trip;
   determining, by the processing device, an estimated time of arrival of the commuter at a transfer point for transfer to the on-demand service segment by analyzing the real-time information relating to the location of the commuter while traveling on a segment that is not the on-demand service segment, the estimated time of arrival being at least one of the following: a random variable associated with a known distribution function, or a random variable associated with a time varying distribution function;
   identifying, by the processing device, a time of availability of an on-demand service vehicle for the commuter to begin the on-demand service segment at the transfer point, as a function of a time of booking;
   determining, by the processing device, while the commuter is traveling the trip, an optimal time of booking of the on-demand service vehicle based on the estimated time of arrival and the time of availability; and
   within a threshold time of the optimal time, transmitting a communication to initiate the on-demand service segment by booking the on-demand service vehicle for the commuter to begin the on-demand service segment at the transfer point.

2. The method of claim 1, wherein the time of availability of the on-demand service vehicle is modeled as one or more of the following:

a known deterministic function of the time of booking;
an unknown deterministic function of the time of booking;
a time-varying stochastic availability function of the time of booking; or
a fixed stochastic function of the time of availability.

3. The method of claim 1, wherein the one or more location tracking sensors comprise one or more of the following: a global positioning service associated with an electronic device of the commuter, a global positioning service associated with a vehicle used by the commuter during the trip, one or more micro-location sensors, or an accelerometer associated with a vehicle used by the commuter during the trip.

4. The method of claim 1, wherein transmitting the communication to initiate the on-demand service segment by booking the on-demand service vehicle for the commuter to begin the on-demand service segment at the transfer point comprises performing one or more of the following:
by the processing device, automatically booking the on-demand service vehicle to arrive at the transfer point within a threshold time of the estimated time of arrival; or
by the processing device, providing an identification of the on-demand service vehicle and the determined optimal time to the commuter for booking the on-demand service vehicle, via a user interface associated with an electronic device of the commuter.

5. The method of claim 1, wherein identifying the time of availability of the on-demand service vehicle at the transfer point as a function of the time of booking, comprises:
identifying a set of commuter preferences;
identifying one or more preferred on-demand service providers based on the set of commuter preferences;
querying the one or more preferred on-demand services for availability at the transfer point at the estimated time of arrival to identify one or more on-demand service vehicles that will be available at the transfer point;
identifying a preferred on-demand service vehicle that will be available at the transfer point at the estimated time of arrival; and
identifying a time of availability of the preferred on-demand service vehicle at the transfer point as a function of a time of booking, as the time of availability of the on-demand service vehicle.

6. The method of claim 5, wherein identifying the preferred on-demand service vehicle comprises performing one or more of the following:
automatically identifying the preferred on-demand service vehicle based on the set of commuter preferences; or
presenting a list comprising information relating to the one or more on-demand service vehicles to the commuter, and receiving a selection of the preferred on-demand service vehicle.

7. The method of claim 5, wherein identifying the set commuter preferences comprises one or more of the following:
receiving one or more commuter preferences from the commuter; or
analyzing a commuter profile associated with the commuter for identifying the one or more commuter preferences, wherein the commuter profile is updated based on self-learning from past commuter action.

8. The method of claim 5, wherein identifying the time of availability of the preferred on-demand service vehicle at the transfer point as a function of the time of booking, comprises identifying the time of availability based on one or more of the following: a real-time location of the on-demand service vehicle, information relating to the transportation network, or information relating to a direction of travel of the on-demand service vehicle.

9. The method of claim 1, further comprising:
monitoring, by the processing device, the transportation network for receiving information relating to the plurality of segments while the commuter travels the trip; and
using the information relating to the plurality of segments in determining the estimated time of arrival of the commuter at the transfer point.

10. The method of claim 9, wherein monitoring the transportation network for receiving information relating to the plurality of segments while the commuter travels the trip comprises one or more of the following:
receiving route information from a map database;
receiving traffic alerts from traffic monitors on the trip;
receiving weather forecasts from weather monitors on the trip;
receiving real-time schedule information for one or more modes of transport associated with the plurality of segments on the trips; or
receiving real-time location information for one or more modes of transport associated with the plurality of segments on the trips.

11. The method of claim 1, further comprising, by the processing device:
creating a location profile for the transfer point, wherein the location profile comprises one or more of the following: commuter demand for a type of on-demand service at the transfer point, on-demand service availability at the transfer point, traffic profile of routes that connect to the transfer point at different times, or types of commuters at the transfer point; and
using the location profile of the transfer point to provide a recommendation to a user.

12. The method of claim 11, wherein:
the user is a commuter on a trip that includes the transfer point; and
the recommendation comprises an alternate route recommendation for the trip based on non-availability of an on-demand service at the transfer point at an estimated time of arrival.

13. The method of claim 11, wherein:
the user is a transport agency that provides public transport in the transportation network; and
the recommendation comprises information relating to provisioning of a public mode of transport at the transfer point.

14. The method of claim 11, wherein:
the user is an on-demand service provider; and
the recommendation comprises information relating to allocation of on-demand resources at the transfer point.

15. A system for automated booking of an on-demand service in a multimodal journey, the system comprising:
a processing device; and
a computer-readable medium containing programming instructions, that are configured to, when executed, cause the processing device to:
receive information related to a multimodal trip plan in a transportation network associated with a trip of a commuter, wherein:
the multimodal trip plan comprises a plurality of segments, and the plurality of segments include an on-demand service segment that requires an on-demand service vehicle as the mode of transport, receive, from one or more location tracking sensors, real-time information relating to a location of the commuter while the commuter travels the trip, determine an estimated time of arrival of the commuter at a transfer point for transfer to the on-demand service segment by analyzing the real-time information relating to the location of the commuter while traveling on a segment that is not the on-demand service segment, the estimated time of arrival being at least one of the following: a random variable associated with a known distribution function, or a random variable associated with a time varying distribution function, while the commuter is traveling the trip, identify a time of availability of an on-demand service vehicle for the commuter to begin the on-demand service segment at the transfer point, as a function of a time of booking, determine an optimal time of booking of the on-demand service vehicle based on the estimated time of arrival and the time of availability, and within a threshold time of the optimal time, transmit a communication to initiate the on-demand service segment by booking the on-demand service vehicle for the commuter to begin the on-demand service segment at the transfer point.

16. The system of claim 15, wherein the time of availability of the on-demand service vehicle is modeled as one or more of the following:
   a known deterministic function of the time of booking;
   an unknown deterministic function of the time of booking;
   a time-varying stochastic availability function of the time of booking; or
   a fixed stochastic function of the time of availability.

17. The system of claim 15, wherein the one or more location tracking sensors comprise one or more of the following: a global positioning service associated with an electronic device of the commuter, a global positioning service associated with a vehicle used by the commuter during the trip, one or more micro-location sensors, or an accelerometer associated with a vehicle used by the commuter during the trip.

18. The system of claim 15, wherein the programming instructions, that are configured to, when executed, cause the processing device to transmit the communication to initiate the on-demand service segment by booking the on-demand service vehicle for the commuter to begin the on-demand service segment at the transfer point comprise programming instructions that are configured to, when executed, cause the processing device to perform one or more of the following:
   automatically book the on-demand service vehicle to arrive within a threshold time of the transfer point at the estimated time of arrival; or
   provide an identification of the on-demand service vehicle and the determined optimal time to the commuter for booking the on-demand service vehicle, via a user interface associated with an electronic device of the commuter.

19. The system of claim 15, wherein the programming instructions, that are configured to, when executed, cause the processing device to identify the time of availability of the on-demand service vehicle at the transfer point as a function of the time of booking comprise programming instructions that are configured to, when executed, cause the processing device to:
   identify a set of commuter preferences;
   identify one or more preferred on-demand service providers based on the set of commuter preferences;
   query the one or more preferred on-demand services for availability at the transfer point at the estimated time of arrival to identify one or more on-demand service vehicles that will be available at the transfer point;
   identify a preferred on-demand service vehicle that will be available at the transfer point at the estimated time of arrival; and
   identify a time of availability of the preferred on-demand service vehicle at the transfer point as a function of a time of booking, as the time of availability of the on-demand service vehicle.

20. The system of claim 19, wherein the programming instructions, that are configured to, when executed, cause the processing device to identify the preferred on-demand service vehicle comprise programming instructions that are configured to, when executed, cause the processing device to perform one or more of the following:
   automatically identify the preferred on-demand service vehicle based on the set of commuter preferences; or
   present a list comprising information relating to the one or more on-demand service vehicles to the commuter, and receiving a selection of the preferred on-demand service vehicle.

21. The system of claim 19, wherein the programming instructions, that are configured to, when executed, cause the processing device to identify the set of commuter preferences comprise programming instructions that are configured to, when executed, cause the processing device to:
   receive one or more commuter preferences from the commuter; or
   analyze a commuter profile associated with the commuter for identifying the one or more commuter preferences, wherein the commuter profile is updated based on self-learning from past commuter action.

22. The system of claim 19, wherein the programming instructions, that are configured to, when executed, cause the processing device to identify the time of availability of the preferred on-demand service vehicle at the transfer point as a function of the time of booking, comprise programming instructions that are configured to, when executed, cause the processing device to identify the time of availability based on one or more of the following: a real-time location of the on-demand service vehicle, information relating to the transportation network, or information relating to a direction of travel of the on-demand service vehicle.

23. The system of claim 15, further comprising programming instructions that are configured to, when executed, cause the processing device to:
   monitor the transportation network for receiving information relating to the plurality of segments while the commuter travels the trip; and
   use the information relating to the plurality of segments in determining the estimated time of arrival of the commuter at the transfer point.

24. The system of claim 23, wherein the programming instructions, that are configured to, when executed, cause the processing device to monitor the transportation network for receiving information relating to the plurality of segments while the commuter travels the trip comprise programming instructions that are configured to, when executed, cause the processing device to receive one or more of the following:

route information from a map database;
traffic alerts from traffic monitors on the trip;
weather forecasts from weather monitors on the trip;
real-time schedule information for one or more modes of transport associated with the plurality of segments on the trips; or
real-time location information for one or more modes of transport associated with the plurality of segments on the trips.

25. The system of claim 15, further comprising programming instructions that are configured to, when executed, cause the processing device to:
create a location profile for the transfer point, wherein the location profile comprises one or more of the following: commuter demand for a type of on-demand service at the transfer point, on-demand service availability at the transfer point, traffic profile of routes that connect to the transfer point at different times, or types of commuters at the transfer point; and
use the location profile of the transfer point to provide a recommendation to a user.

26. The system of claim 25, wherein:
the user is a commuter on a trip that includes the transfer point; and
the recommendation comprises an alternate route recommendation for the trip based on non-availability of an on-demand service at the transfer point at an estimated time of arrival.

27. The system of claim 25, wherein:
the user is a transport agency that provides public transport in the transportation network; and
the recommendation comprises information relating to provisioning of a public mode of transport at the transfer point.

28. The system of claim 25, wherein:
the user is an on-demand service provider; and
the recommendation comprises information relating to allocation of on-demand resources at the transfer point.

\* \* \* \* \*